United States Patent
Gray et al.

(10) Patent No.: US 9,406,103 B1
(45) Date of Patent: Aug. 2, 2016

(54) INLINE MESSAGE ALERT

(71) Applicant: Amazon Technologies, Inc., Reno, NV (US)

(72) Inventors: Timothy T. Gray, Seattle, WA (US); Aaron Michael Donsbach, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 199 days.

(21) Appl. No.: 13/627,291

(22) Filed: Sep. 26, 2012

(51) Int. Cl.
G09G 5/00 (2006.01)
G06T 3/00 (2006.01)

(52) U.S. Cl.
CPC .................... G06T 3/0068 (2013.01)

(58) Field of Classification Search
None
See application file for complete search history.

(56) References Cited

U.S. PATENT DOCUMENTS

| | | | |
|---|---|---|---|
| 6,591,198 B1 | 7/2003 | Pratt | |
| 7,250,955 B1 * | 7/2007 | Beeman et al. | 345/592 |
| 7,996,045 B1 * | 8/2011 | Bauer et al. | 455/566 |
| 8,131,848 B1 | 3/2012 | Denise | |
| 2008/0211778 A1 | 9/2008 | Ording et al. | |
| 2010/0079508 A1 | 4/2010 | Hodge et al. | |
| 2010/0125816 A1 | 5/2010 | Bezos | |
| 2011/0173681 A1 * | 7/2011 | Qureshi et al. | 726/4 |
| 2012/0064948 A1 | 3/2012 | Lee et al. | |
| 2012/0262582 A1 | 10/2012 | Kimchi et al. | |
| 2014/0013196 A1 * | 1/2014 | White | 715/205 |

OTHER PUBLICATIONS

"Features of biteSMS for iOS 4 and Higher." Delicious Inc., Aug. 5, 2011.*
"ZTE Warp SequentTM User Manual." ZTE Corporation, Jul. 24, 2012.*
"Non Final Office Action dated Sep. 26, 2014", U.S. Appl. No. 13/867,988, 18 pages.

* cited by examiner

Primary Examiner — Edward Martello
(74) Attorney, Agent, or Firm — Polsinelli LLP (57) ABSTRACT

A computing device can be running a current context and displaying a current interface for the current context when a communication is received on the device. The device can display an alert on a portion of a display screen in conjunction with the current interface being displayed. The alert can include information about the communication, which can allow a user to better determine whether or not the communication requires immediate attention. If the user ignores the alert, it will disappear in a specified amount of time. If the user chooses to deal with the communication, he/she can tap on the alert to bring up an overlay interface for replying to the communication without having to switch to another application specifically configured for handling (e.g., viewing, replying to) the communication. After the user replies to the communication using the overlay interface, he/she can be automatically brought back to the current interface.

25 Claims, 7 Drawing Sheets

INLINE MESSAGE ALERT

BACKGROUND

Computing devices are often used for running applications. Multiple applications are commonly executed and running simultaneously as multitasking has become increasingly more efficient. Many computing device users run multiple applications at the same time in their everyday routines. For example, a user in his/her car might use a GPS application while also using a music playing application. In another example, a user playing a video game application might also be replying to text messages via a text messaging application. Furthermore, push notifications and real-time alerts and notifications have also become popular. Users of computing devices often desire to know the moment they receive electronic mails (e.g., push email), text messages, and other software announcements (e.g., software updates, social network notifications, etc.). However, often times a user may be engaged in an application, such as a game app or a movie watching app, when a message is received. If the user wants to look at or reply to the message, he/she has to exit or switch out of his/her currently engaged application and switch to another application for accessing the message. This is inconvenient and inefficient because the computing device has to switch back and forth between multiple applications. As such, a more efficient approach to handling received messages is needed.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to managing context in a computing device. In particular, various embodiments of the present disclosure can provide for performing an action with respect to (e.g., replying to) a received communication without having to switch out of a current context on a computing device, such as to close a current application and open an application specifically configured to enable the user to view and perform various actions with respect to the communication.

In some embodiments, at least a first application is running on a computing device. An interface for the first application can be displayed on a display screen of the device. While the user is operating and/or interacting with the first application, an incoming message (or other such communication) can be received on (or generated by) the computing device. There can be a second application that is the default program for performing tasks associated with the type of message (e.g., viewing the message, replying to the message, etc.). The computing device can provide an alert (i.e., notification) indicating that the message has been received. The alert can be displayed on a portion of the display screen while at least a portion of the interface for the first application is displayed on the remaining portion of the screen. In some embodiments, a sound and/or a vibration can be presented in conjunction with the displaying of the alert. The alert can contain sufficient information for the user to decide whether to address/deal with the message now or whether he/she can address/deal with the message later. For example, the alert can include the name of the sender and one or two lines of the message. As such, the user can perhaps make a quick, but informed determination as to whether the message warrants his/her immediate attention or not.

If the user decides to ignore the alert (i.e., notification) in at least one embodiment, the alert will disappear from the screen after a specified amount of time and the alert will be stored in a notification group that can be easily accessed by the user later on. If the user decides to deal with the message now, he/she can tap on the alert to launch an interface without switching out of the first application and into the second application. The interface can be presented as overlaying the first application and can enable the user to perform one or more actions with respect to the message (e.g., view the message, reply to the message, etc.). In some embodiments, the interface can be an extension and/or a modified version (e.g., basic/simple version) of the second application. In response to having performed the one or more actions with respect to the message, the user can be automatically returned to the first application. As such, the user who is currently using the first application can, for example, reply to the message without switching out of the first application and into the second (e.g., messaging) application, thereby saving valuable time, effort, and resources. In some embodiments, the first application can be paused when the user chooses to launch the interface; the first application can automatically resume after the user has performed the one or more actions with respect to the message using the interface. Many other alternatives and variations are described and suggested below in relation to at least some of the various embodiments.

Figure 1:
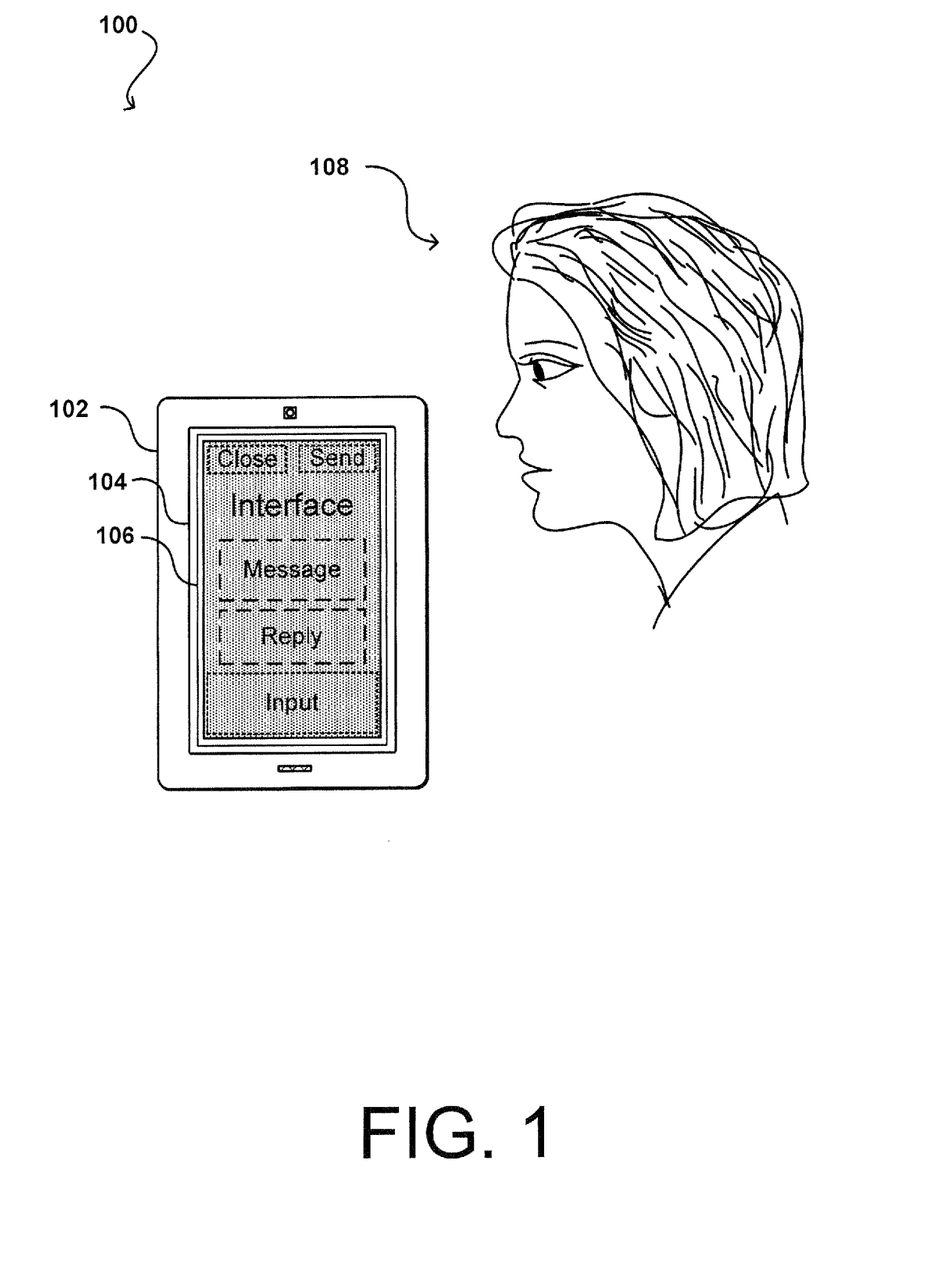
FIG. 1 illustrates an example environment in which aspects of the various embodiments can be utilized.

FIG. 1 illustrates an example environment in which aspects of the various embodiments can be utilized. In the example environment 100, there can be a computing device 102. The computing device 102 can comprise a display screen 104. The computing device 102 can run an application 106. A user 108 or the computing device 102 can operate and/or interact with the application 106 to perform various tasks.

The application 106 running on the computing device 102 can be any application, such as an app, browser, game, utility, etc. In some embodiments, the computing device 102 can execute a plurality of applications. For example, one of the plurality of applications (e.g., App A) can be running in the foreground of the device 102 (i.e., foreground process), while some other applications (e.g., App B, App C, etc.) can run in the background (i.e., background processes), while the remaining applications (e.g., App D, App E, etc.) on the device 102 are not currently being executed/run. The user 108 of the device 102 can be using App A, which is running in the foreground. The user 108 can switch to another app, such as App B, thereby making App B run in the foreground and placing App A in the background.

In some embodiments, switching from a current application to another application involves removing the current application (e.g., or an interface thereof) from focus and bringing the other application (e.g., or an interface thereof) into focus. In some embodiments, switching from one application to another involves placing the former application (e.g., or an interface thereof) into the background and bringing the latter application (e.g., or an interface thereof) into the foreground. In some embodiments, switching from a first application to a second application involves disabling/terminating the first application and enabling/initiating the second application.

Figure 2A:
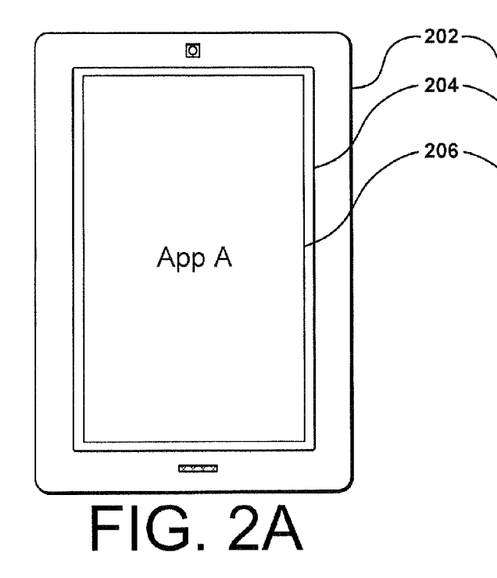
FIG. 2A illustrates an example device embodiment for handling inline message alerts.

FIG. 2A illustrates an example device embodiment for handling inline message alerts. The example computing device 202 can be executing an application (i.e., App A) 206. In FIG. 2A, the application 206 is shown to be running in the foreground of the device 202; in other words, App A 206 is running as a foreground process. In some embodiments, there can be other applications running in the background (i.e., as background processes) and still other applications that are not being run on the device 202. Moreover, the computing device 202 comprises a display screen 204. The application 206 (or an interface of the application 206) can be presented on the display screen 204, as shown in FIG. 2A.

Figure 2B:
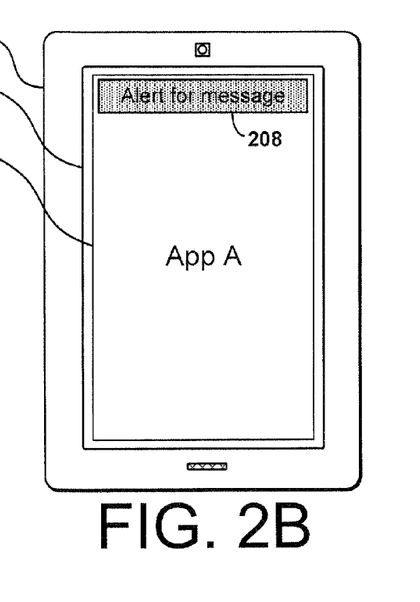
FIG. 2B illustrates an example device embodiment for handling inline message alerts.

FIG. 2B illustrates an example device embodiment for handling inline message alerts. In FIG. 2B, the computing device 202 is running App A 206 and displaying an interface of App A 206 on the display screen 204. In some embodiments, the computing device 202 can receive a message (or communication), which can include various data. For example, the message can be a text message (e.g., short message service (SMS) text message, chat message, etc.), a multimedia message (e.g., image/video message, audio message, voicemail, etc.), an electronic mail (email) message, a message regarding a software announcement (e.g., app update, app report/notice, app promotion/advertisement, social network notification, etc.), a system message (e.g., an operating system update, a calendar event, a clock alarm, a reminder, etc.), or other various types of messages.

In some embodiments, the message is a type that is associated with another application (i.e., App B). In some embodiments, the message is a type associated with the other application in that the message is a type that is native to the other application; in other words, the other application (i.e., App B) can be the default program for opening the message. App B can be specifically configured to work with (e.g., view, open, reply to) the message. For example, if the message is a text message, then App B can be a text messaging app. In another example, if the message is an email message, then App B can be an email app. However, often times, when the message is received, the application with which the message is associated (i.e., App B) is not currently running on the device 202 or is running in the background of the device 202, whereas App A 206 is running in the foreground of the device 202.

When the message is received on the device 202, the device 202 can display an alert (i.e., notification) 208 to indicate that the message has been received. In some embodiments, the alert 208 for the message can be presented on a portion of the display screen 204 in conjunction with (the interface of) the application 206 currently being run in the foreground. For example, the alert 208 can be displayed in a top, horizontal portion of the display screen 204 (as in FIG. 2B), the portion being only a small area (e.g., 5%, 10%, etc.) relative to the entire area of the screen 204; the remainder of the display screen 204 can still be used to display the interface for App A 206. As such, the alert 208 can be unobtrusive with respect to the operation(s) of App A 206, but still be viewable to a user of the computing device.

In some embodiments, the alert 208 can include sufficient information about the message to allow the user to make an informed decision regarding whether he/she should deal with (e.g., view, reply to) the message now (e.g., pause use of App A) or deal with the message later (e.g., finish using App A). For example, the alert 208 can include at least information about the sender of the message (e.g., name of the sender, phone number of the sender, email address of the sender, picture of the sender, etc.) and at least a portion of the content of the message (e.g., the first twelve words, the first line, etc.). In some embodiments, the alert 208 can include a time (including date) of when the message was sent and/or received. Accordingly, if, for example, the user sees that the sender is someone the user is expecting to hear from and/or if the portion of the content of the message seems urgent, then the user can reply immediately; otherwise the user can wait to deal with the message later.

Figure 2C:
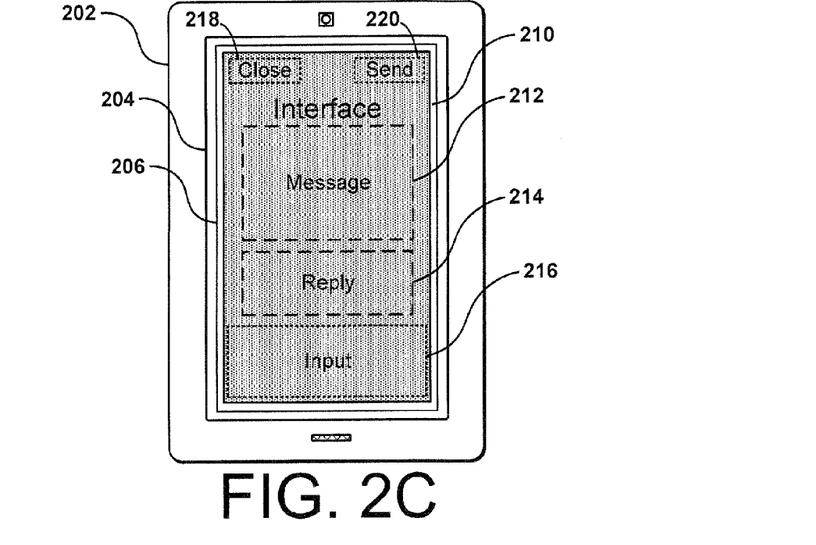
FIG. 2C illustrates an example device embodiment for handling inline message alerts.

In some embodiments, the user desires to deal with the message immediately. Instead of terminating and/or switching out of App A 206 to go into App B to handle the message, the device 202 can provide the user an option to handle the message while App A 206 is still running, as shown in FIG. 2C. For example, the alert 208 itself can be a button that provides the option for the user to handle the message immediately; the option can be selected when the user taps on the alert 208 (e.g., button) displayed on the display screen 204 (assuming that the display screen 204 comprises a touch sensor—i.e., assuming the display screen is a touchscreen), resulting in an interface 210 being provided/presented. In other words, the interface 210 can be provided/presented when the user taps on the alert 208 on the display screen (e.g., touchscreen) 204. In some embodiments, the interface 210 is presented as overlaying a portion of the interface of App A 206.

The interface 210 can handle/deal with the message by allowing the user to perform one or more actions with respect to the message. For example, if the message is a communicational message, the user can send a reply to the message (e.g., send a reply text message, send a reply email, etc.) using the interface 210. Continuing with the example, the user can use the interface 210 to view/read the communicational message and to type/input a reply message.

In addition to sending replies, the interface 210 can enable the user to perform various other actions with respect to the message. For example, if the message includes instructions or a link for downloading data, the interface 210 can allow the user to initiate a download of the data; once the download is initiated, the device 202 can automatically return to the interface of App A 206. In another example, if the message includes data (e.g., software update file, media file, etc.), the interface 210 can enable the user to initiate utilization of the data (e.g., installing the software update file, playing the media file, etc.); the device 202 can automatically return to the interface of App A 206 when the utilization of the data is initiated. As such, the interface 210 eliminates the need to terminate and/or switch out of App A 206 to go into App B to handle/deal with the message.

In some embodiments, the alert 208 can provide at least one additional option for performing at least one additional action with respect to the message. For example, if the alert 208 is tapped with two fingers instead of one (as detected by the touchscreen), the message can be deleted. In another example, when the alert 208 pressed (and held) for a specified amount of time (e.g., 1 second, 2 seconds, etc.), a menu with various options for performing various actions with respect to the message can be provided. The various actions can include deleting the message, moving the message into a folder/directory, blocking a sender of the message, launching an application associated with the message, downloading data associated with the message, or utilizing data included in the message. After the user selects an action, he/she can automatically be returned back to his/her previous state/context (e.g., the interface for App A 206).

In some embodiments, as discussed above, the message (e.g., text, multimedia, email) is a communicational message from a sender of the message. The user wanting to reply to the message immediately can tap the alert 208, which brings about the interface 210 without terminating and/or switching out of App A. In some embodiments, the interface 210 can comprise a view/rendering of the message 212, a text input field 214 for replying to the message, and one or more input keys/methods (e.g., a keyboard) 216. The user can type his/her reply message into the reply text input field 214 via keyboard input 216. If the user changes his/her mind and does not want to reply right now, he/she can close the interface 210 by selecting the close button 218, thereby automatically returning the user to his/her previous context (e.g., App A 206). If, however, the user is ready to send his/her reply message, he/she can select the send button 220 to send the reply message. In response to selecting the send button 220, the interface 210 can be removed from display on the display screen 204 and the user can automatically be returned to his/her previous context (e.g., App A 206).

If the user chooses not to deal with the message immediately, he/she can ignore the alert 208. In some embodiments, if the user ignores the alert 208 for a specified amount of time (i.e., iii the option provided by the alert 208 to handle/deal with the message is not selected by the user within a specified time period, e.g., 3 seconds, 4 seconds, etc.), then the alert 208 can be removed from display on the display screen 204. As such, the alert 208 for the message should not have caused significant interference to the use of App A 206.

In some embodiments, App A can be (a part of) an operating system of the computing device. For example, App A can be a "home screen," "desktop," or "screen lock," etc., of the operating system. Accordingly, in some embodiments, the present disclosure can enable the user to handle messages without having to switch away from the "home screen," "desktop," or "screen lock," etc., into another application (i.e., App B) specifically configured to handle/deal with messages.

In some embodiments, App A 206 and App B can be the same application. For example, the user can be using a text message application to write a message to a peer while an incoming text message from his/her parent is received. The user can quickly reply to his/her parent's message by tapping on the alert 208 and utilizing the interface 210 provided. After he/she replies to his/her parent's message, the user can be automatically returned to his/her message to the peer.

Figure 3A:
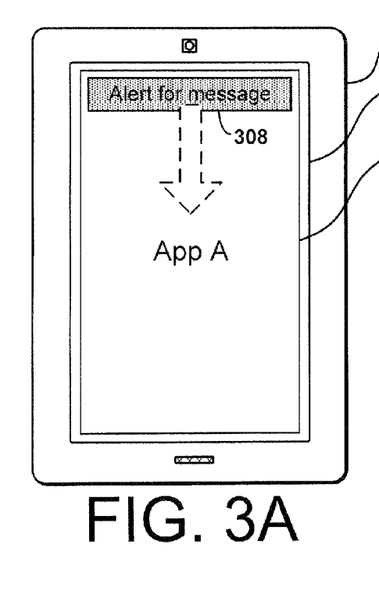
FIG. 3A illustrates an example device embodiment for handling inline message alerts.

Referring now to FIG. 3A, FIG. 3A illustrates an example device embodiment for handling inline message alerts. There can be a computing device 302 running an application (i.e., App A) 306. The application 306 (or an interface of the application 306) can be displayed on a display screen 304 on the computing device 302. When an incoming message is received on the device 302, there can be an alert 308 displayed on a portion of the display screen 304 while App A 306 is still running and its interface still being displayed in the remaining portion of the display screen 304.

Figure 3B:
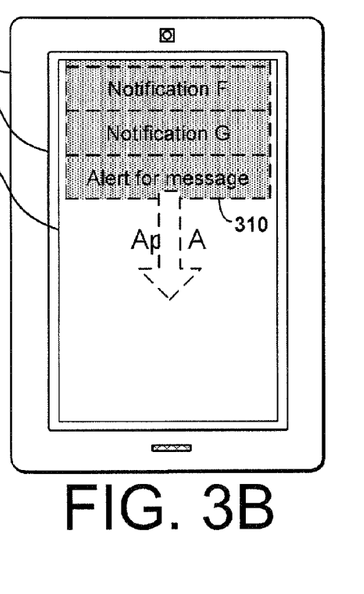
FIG. 3B illustrates an example device embodiment for handling inline message alerts.

In some embodiments, the display screen 304 comprises a touch sensor (i.e., the display screen 304 is a touchscreen) capable of detecting a dragging gesture by the user. The user can drag the alert 308 (or an area on the screen 304 close in proximity to the alert 308) at the top of the screen 304 in a downward direction toward the bottom of the screen 304. The dragging gesture from top to bottom can cause a notification group (e.g., list of notifications) to be pulled down and presented as overlaying (the interface of) App A 206. FIG. 3B illustrates the notification group 310 in the midst of being pulled down.

In some embodiments, the notification group can be opened when no alerts are displayed on the screen 304. For example, there can be a small key/area (not shown in FIG. 3B or FIG. 3C) on the top, center area of the top edge of the screen 304. The user can drag the key/area downward to pull down the notification group 310.

Figure 3C:
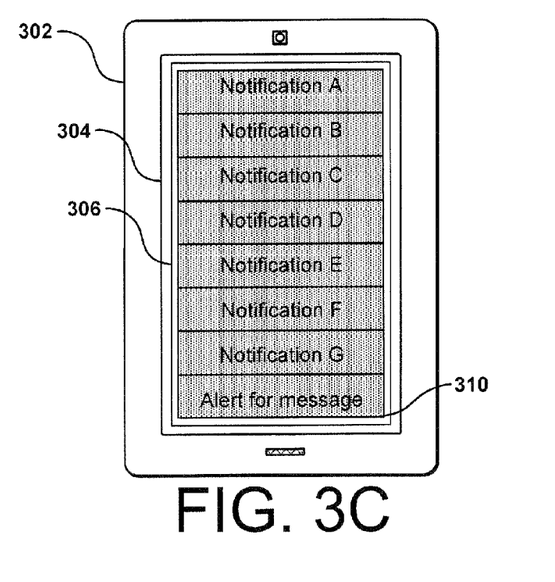
FIG. 3C illustrates an example device embodiment for handling inline message alerts.

FIG. 3C illustrates an example device embodiment for handling inline message alerts. FIG. 3C includes a notification group 310 being pulled down. The notification group 310 comprises notifications, which can be former alerts, each of which is associated with a respective message (or communication). As such, the alert 308 for the message can also be stored as a notification. In particular, the alert 308 can be stored as the newest/most recent notification in the notification group 310. Referring to FIG. 3C, out of those notifications in the notification group (e.g., notification list) 310, "Notification A" is the oldest while the alert 308 (to be stored as "Notification H") is the newest/most recent.

The notification group 310 can store the alerts that were previously ignored by the user (as well as those that were acted upon by the user). For example, if the user was previously busy with App A 306 and ended up ignoring one or more alerts, the one or more alerts can be stored in the notification group 310. When the user is no longer busy with App A 306 or decides to check the notifications (i.e., past alerts), he/she can open the notification group 310 and decide what to do with the one or more alerts he/she previously ignored (each of which is now stored as a "Notification").

In some embodiments, the user can tap the notification (and corresponding message) he/she wants to deal with and/or handle. The user can tap on a notification to trigger an interface (similar to the interface 210 in FIG. 2C) for that notification to be provided/presented. As discussed previously, the interface can enable the user to perform an action with respect to the message (e.g., reply to the message) for that notification. As discussed above, in some embodiments, the user can press on a notification for a specified amount of time to open a menu with various options for performing various actions with respect to the message corresponding to that notification.

In some embodiments, the notification group 310 can be closed (i.e., removed from display on the display screen 304) when the user performs a dragging gesture in a direction opposite to that of opening the notification group 310. For example, the user can drag the "Alert for message" in FIG. 3C upward to close the notification group 310. In another example, the notification group 310 can be closed by dragging an area at the center, bottom edge of the screen 304 upward to the top edge of the screen 304.

Figure 4:
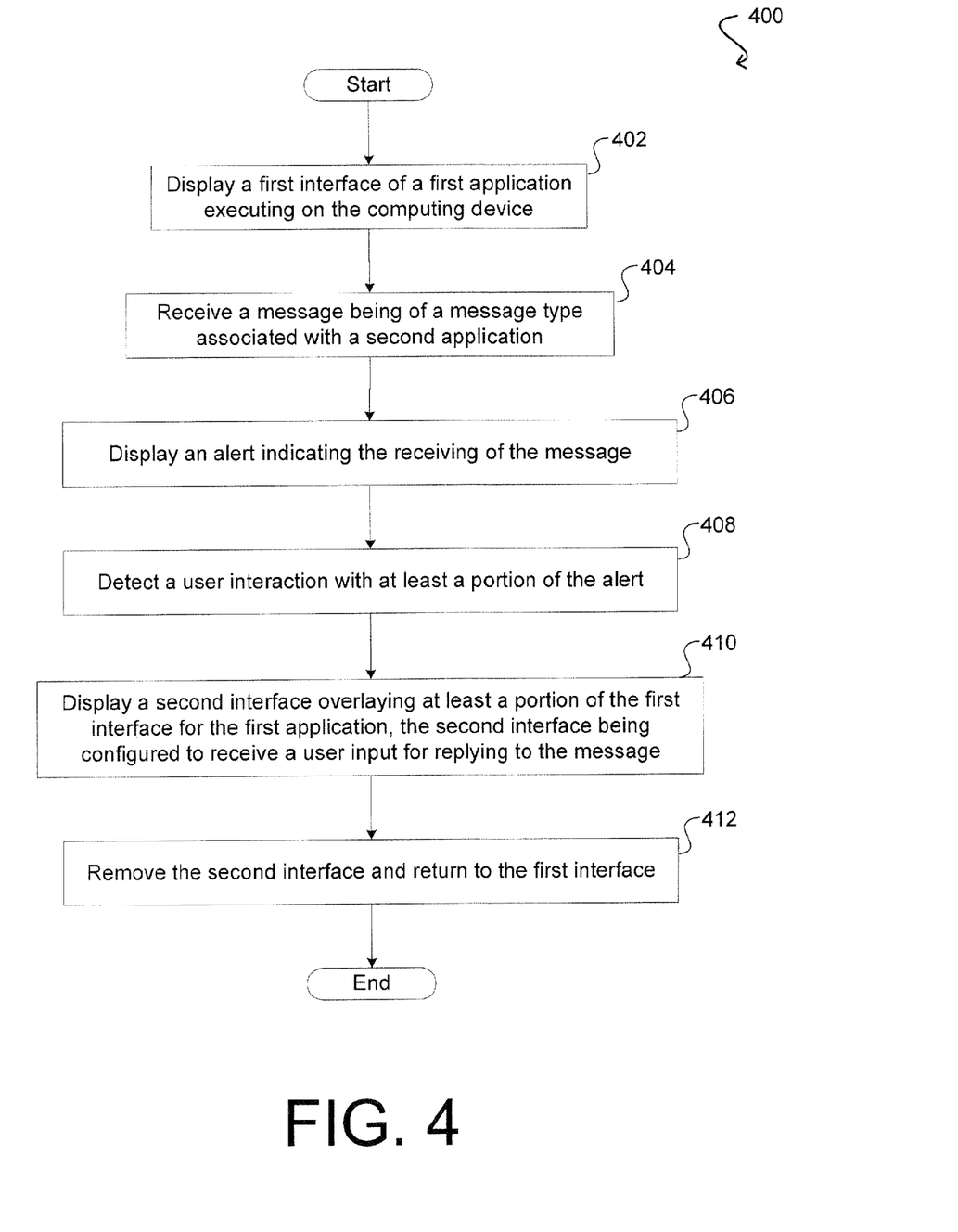
FIG. 4 illustrates an example method embodiment for handling inline message alerts.

FIG. 4 illustrates an example method embodiment for handling inline message alerts. It should be understood that there can be additional, fewer, or alternative steps performed in similar or alternative orders, or in parallel, within the scope of the various embodiments unless otherwise stated. The example method embodiment 400 can begin with displaying, on a display screen of a computing device, a first interface of a first application executing on the computing device, at step 402. For example, the method 400 can determine to present a communication that is a message received on a computing device. At step 404, the example method can receive a message, the message being of a message type associated with a second application.

At step 406, the method can display, on a portion of the display screen, an alert indicating the receiving of the message, wherein the alert includes information indicative of a sender of the message and at least a portion of the content of the message. The alert can be displayed on a top, horizontal strip of the display screen, while the remaining portion of the screen can be for displaying the first interface for the first application, such as a game interface for a game application.

At step 408, the example method 400 can detect a user interaction with at least a portion of the alert. At step 410, the example method 400 can display, based on the detected user interaction, a second interface, the second interface overlaying at least a portion of the first interface for the first application. The second interface can be configured to receive a user input for replying to the message without switching to the second application. At step 412, the method can remove the second interface from the display screen and return to the first interface.

Figure 5:
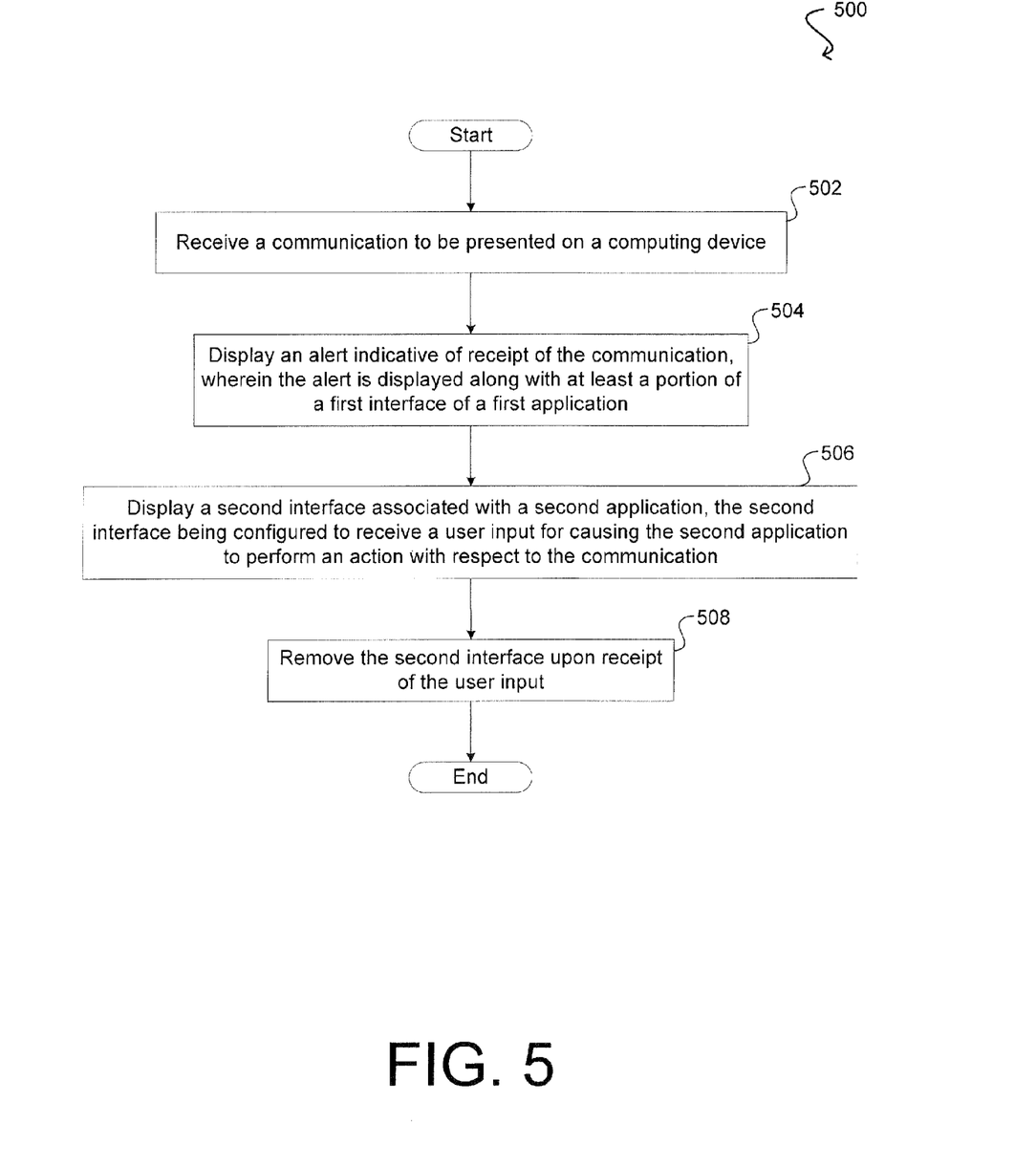
FIG. 5 illustrates an example method embodiment for handling inline message alerts.

FIG. 5 illustrates an example method embodiment for handling inline message alerts. Again, it should be understood that there can be additional, fewer, or alternative steps performed in similar or alternative orders, or in parallel, within the scope of the various embodiments unless otherwise stated. The example method embodiment 500 can begin with receiving a communication to be presented on a computing device, at step 502. At step 504, the example method 500 can displaying, on a portion of a display screen of the computing device, an alert indicative of receipt of the communication. The alert can be displayed along with at least a portion of a first interface of a first application of the computing device and can provide an option for displaying a second interface for performing an action with respect to the communication.

Step 506 can involve displaying, on the display screen, the second interface associated with a second application based on a selection of the option. The second interface can be overlaying the first interface and can be configured to receive a user input for causing the second application to perform the action. The example method can remove the second interface upon receipt of the user input, at step 508.

In some embodiments, the interface 210 has features similar to that of the applications (natively) associated with their respective messages. In other words, in some embodiments, an interface 210 can have features that are specifically configured to operate with a specific message type. For example, an interface for an mp3-type message can have a "Play Music" button. In another example, an interface for a software-update-type message can have an "Install Update" button. In some embodiments, the interface 210 for a particular message can have features similar to a lite version of the application specifically configured for (the type of) the message (i.e., App. B).

In some embodiments, the alert (e.g., 208, 308) can provide multiple options for various actions. For example, within the alert, there can be a button to launch the application (i.e., App B) that is (natively) associated with (e.g., specifically configured for) the message (type), whereas the remaining portion of the alert (not including the App B launching button) can be a button to initiate the interface 210.

Various embodiments consistent with the present disclosure can also be implemented for multiple gestures. In some embodiments, more than one gesture can be performed with respect to the alert (e.g., 208, 308) to initiate various actions. For example, a one-finger tap can initiate the interface 210 for the message (or communication), a two-finger tap can delete the message, a swipe across the alert can move the message into a spam folder or other directory, and a pressing of the alert for a specified amount of time can bring up a menu for additional options and actions.

Figure 6:
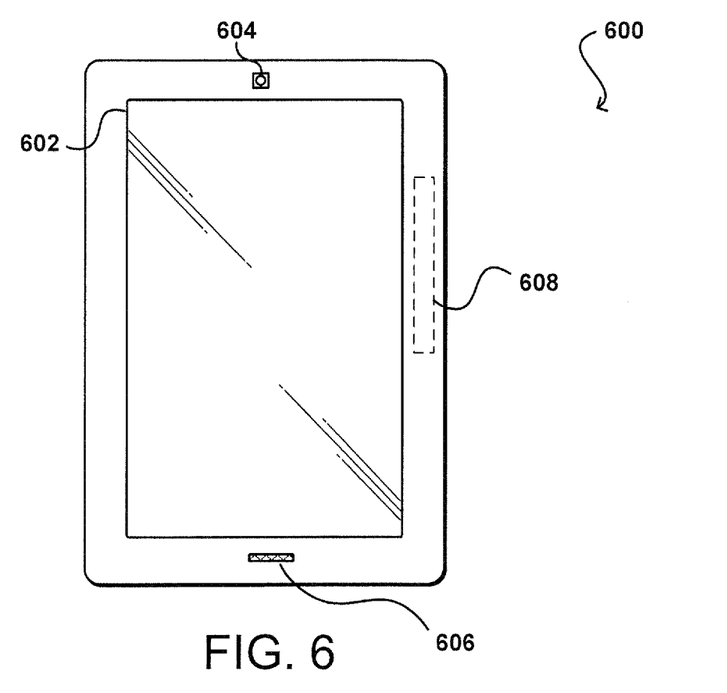
FIG. 6 illustrates an example device that can be used to implement aspects of the various embodiments.

FIG. 6 illustrates an example electronic user device 600 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 600 has a display screen 602 on the front side, which under normal operation will display information to a user facing the display screen (e.g., on the same side of the computing device as the display screen). The computing device in this example includes at least one camera 604 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 600 also includes at least one microphone 606 or other audio capture device capable of capturing audio data, such as words or commands spoken by a user of the device. In this example, a microphone 606 is placed on the same side of the device as the display screen 602, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 600 also includes at least one orientation sensor 608, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 7:
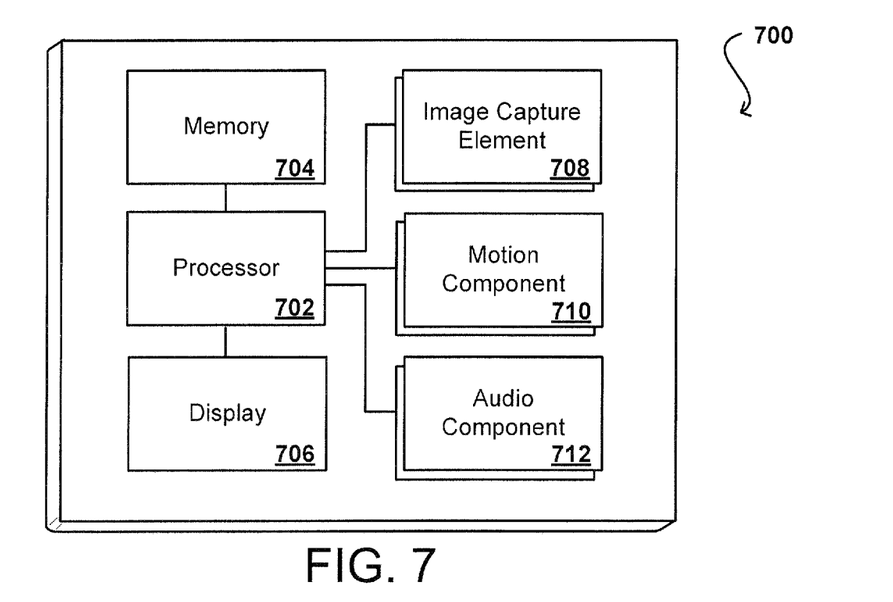
FIG. 7 illustrates example components of a client device such as that illustrated in FIG. 6.

FIG. 7 illustrates a logical arrangement of a set of general components of an example computing device 700 such as the device 600 described with respect to FIG. 6. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. As discussed, the device in many embodiments will include at least one image capture element 708 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 712, such as a mono or stereo microphone or microphone array, operable to capture audio information from at least one primary direction. A microphone can be a uni- or omni-directional microphone as known for such devices.

In some embodiments, the computing device 700 of FIG. 7 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 700 also can include at least one orientation or motion sensor 710. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 702, whereby the device can perform any of a number of actions described or suggested herein.

As an example, a computing device such as that described with respect to FIG. 6 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 8:
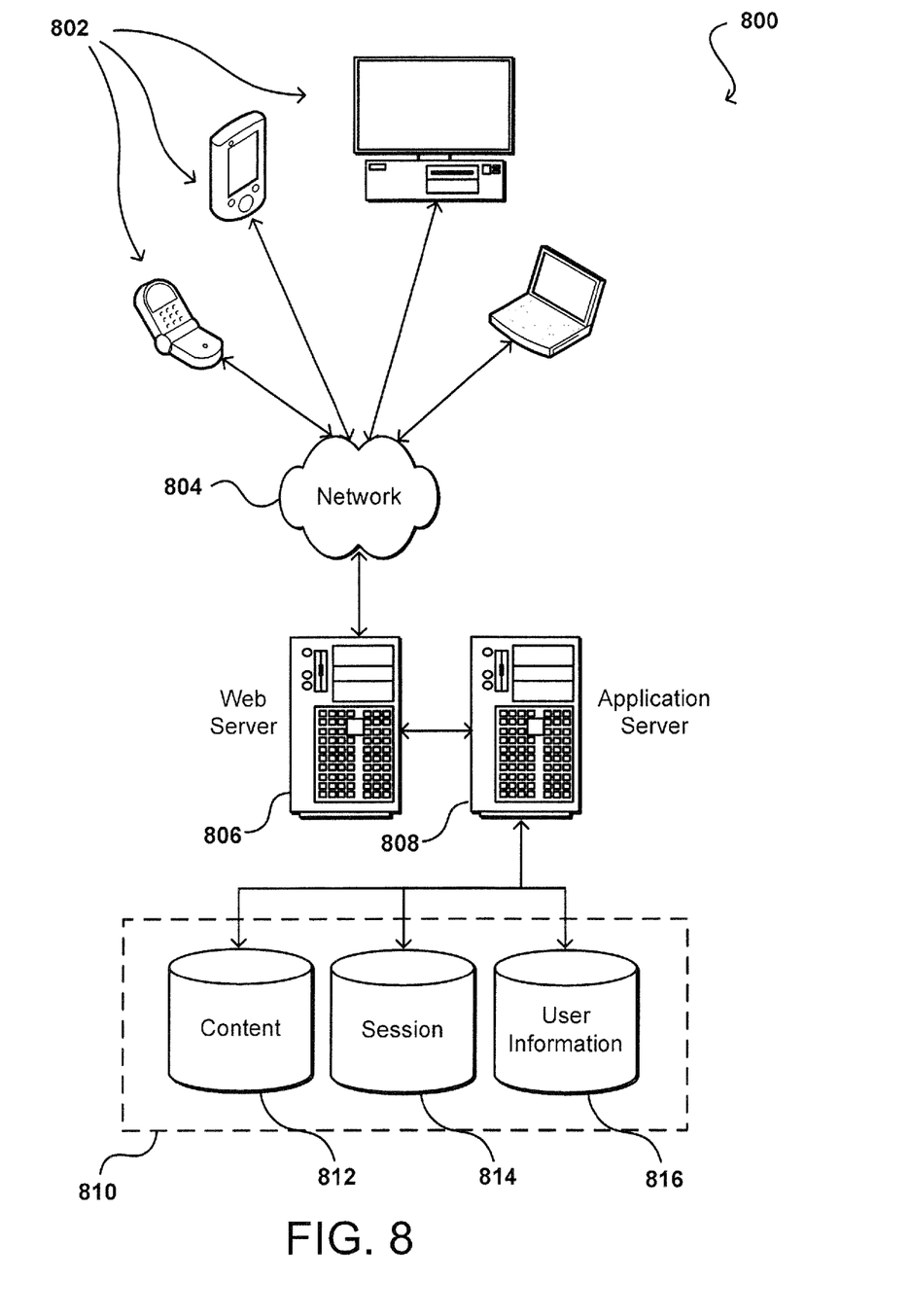
FIG. 8 illustrates an environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 802. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method comprising:
    displaying, using substantially all pixels of a display screen of a computing device, a first interface of a first application executing on the computing device;
    receiving a message, the message being of a message type associated with a second application;
    displaying, on a portion of the display screen, an alert indicating receipt of the message, the alert including information indicative of a sender of the message and at least a portion of the message;
    detecting a first user interaction with at least a portion of the alert;
    displaying, based on the first user interaction, a second interface that overlays the first interface and includes features that correspond to the message type associated with the second application, the second interface being rendered without switching to the second application;
    detecting a second user interaction that corresponds to sending a reply to the message;
    removing the second interface from the display screen; and
    displaying, using substantially all of the pixels of the display screen, the first interface,
    wherein the second interface is removed and the first interface is displayed without the computing device detecting a third user interaction.

2. The computer-implemented method of claim 1, wherein the message comprises at least one of a text message, a multimedia message, an email message, a software announcement message, or a system message.

3. The computer-implemented method of claim 1, further comprising:
    receiving a second message to the computing device;
    displaying, on a portion of the display screen, a second alert indicating receipt of the second message;
    detecting no user interaction corresponding to the second alert within a specified amount of time; and
    removing the second alert from the display screen.

4. The computer-implemented method of claim 1, wherein the message is a media message type and the second interface includes a feature for pausing the media message type.

5. A computer-implemented method comprising:
    displaying a first interface of a first application of a computing device on a display screen of the computing device;
    receiving a communication to the computing device;
    displaying, on a portion of the display screen, an alert indicative of receipt of the communication, the alert being displayed along with the first interface;
    receiving a first user interaction that corresponds to the alert;
    displaying, on the display screen, a second interface overlaying the first interface and including features for performing an action with respect to the communication, the second interface being rendered without switching to a second application;
    receiving a second user interaction that corresponds to sending a reply to the communication;
    removing the second interface from the display screen; and
    displaying the first interface on the display screen,
    wherein the second interface is removed and the first interface is displayed without the computing device receiving a third user interaction.

6. The computer-implemented method of claim 5, wherein the first application is a media player application, the method further comprising:
    pausing content displayed on the first interface of the media player application; and
    automatically resuming the content displayed on the first interface of the media player application.

7. The computer-implemented method of claim 5, wherein the alert comprises at least one of information indicative of a sender of the communication, a picture of the sender, or a portion of content of the communication.

8. The computer-implemented method of claim 5, wherein the communication comprises at least one of a text message, a multimedia message, an email message, a software announcement message, or a system message.

9. The computer-implemented method of claim 5, further comprising:
    receiving a second communication to the computing device;
    displaying, on a portion of the display screen, a second alert indicative of receipt of the second communication, the second alert being displayed along with the first interface;
    receiving no user interaction that corresponds to the second alert within a specified amount of time; and
    removing the second alert from the display screen.

10. The computer-implemented method of claim 5, wherein the alert is stored as a new notification in a notification group.

11. The computer-implemented method of claim 5, wherein the display screen comprises a touch sensor, and receiving the first user interactions includes:
detecting, by the touch sensor, an interaction with at least a portion of the alert.

12. The computer-implemented method of claim 11, further comprising:
providing at least one additional option for performing at least one additional action with respect to the communication based on an additional user interaction with at least a portion of the alert, the at least one additional action including at least one of deleting the communication, moving the communication into a directory, blocking a sender of the communication, launching an application associated with the communication, downloading data associated with the communication, or utilizing data included in the communication.

13. The computer-implemented method of claim 11, further comprising:
detecting, by the touch sensor, a first dragging gesture from a first edge of the display screen toward a second edge provided opposite the first edge; and
displaying, on the display screen, a notification group including the alert as part of a plurality of notifications, wherein the notification group is displayed overlaying a portion of the first interface of the first application.

14. The computer-implemented method of claim 13, wherein each notification in the notification group provides an option to either perform an action with respect to a communication corresponding to the respective notification or launch an application associated with the communication corresponding to the respective notification.

15. The computer-implemented method of claim 13, further comprising:
detecting, by the touch sensor, a second dragging gesture from the second edge of the display screen toward the first edge;
removing the notification group from the display screen; and
displaying the first interface on the display screen.

16. A computing device comprising:
a display screen;
a processor; and
a memory device including instructions that, when executed by the processor, cause the computing device to:
display a first interface of a first application of the computing device on the display screen;
receive a communication to the computing device;
display, on a portion of the display screen, an alert indicative of receipt of the communication, the alert being displayed along with the first interface;
receive a first user interaction that corresponds to the alert;
display, on the display screen, a second interface overlaying the first interface and including features for performing an action with respect to the communication, the second interface being rendered without switching to a second application;
receive a second user interaction that corresponds to sending a reply to the communication;
remove the second interface from the display screen; and
display the first interface on the display screen,
wherein the second interface is removed and the first interface is displayed without detecting a third user interaction.

17. The computing device of claim 16, further comprising:
a touch sensor included in the display screen,
wherein the instructions that cause the computing device to receive the first user interaction include causing the computing device to
detect, by the touch sensor, an interaction with at least a portion of the alert.

18. The computing device of claim 17, wherein the second interface includes at least one additional option for performing at least one additional action with respect to the communication, and the at least one additional action including at least one of deleting the communication, moving the communication into a directory, blocking a sender of the communication, launching an application associated with the communication, downloading data associated with the communication, or utilizing data included in the communication.

19. The computing device of claim 17, wherein the instructions further cause the computing device to:
detect, by the touch sensor, a first dragging gesture from a first edge of the display screen toward a second edge provided opposite the first edge;
display, on the display screen, a notification group including the alert as part of a plurality of notifications, wherein the notification group is displayed overlaying a portion of the first interface.

20. The computing device of claim 19, wherein the instructions further cause the computing device to:
receive, by the touch sensor, a second dragging gesture from the second edge of the display screen toward the first edge, the second dragging gesture causing the notification group to be removed from the display screen in order to display the first interface.

21. The computing device of claim 16, further comprising:
a camera configured to capture at least one image, wherein the action performed with respect to the communication initiates a transmission of the at least one image captured by the camera to a sender of the communication.

22. A non-transitory computer-readable storage medium including instructions that, when executed by a processor of a computing device, cause the computing device to:
display a first interface of a first application of the computing device on a display screen of the computing device;
receive a communication to the computing device;
display, on a portion of the display screen, an alert indicative of receipt of the communication, the alert being displayed along with the first interface;
receive a first user interaction that corresponds to the alert;
display, on the display screen, a second interface overlaying the first interface and including features for performing an action with respect to the communication, the second interface being rendered without switching to a second application;
receive a second user interaction that corresponds to sending a reply to the communication;
remove the second interface from the display screen; and
display the first interface on the display screen,
wherein the second interface is removed and the first interface is displayed without the computing device receiving a third user interaction.

23. The non-transitory computer-readable storage medium of claim 22, wherein the communication includes one or more software update files and the action performed with respect to the communication initiates installing the one or more software update files included in the communication.

24. The non-transitory computer-readable storage medium of claim 22, wherein the communication includes one or more media files and the action performed with respect to the communication initiates a playing of the one or more media files included in the communication.

25. The non-transitory computer-readable storage medium of claim 22, wherein the communication includes one or more instructions for downloading data from a server external to the computing device and wherein the action performed with respect to the communication initiates a download of the data from the server.

* * * * *